(12) United States Patent
Yamazaki et al.

(10) Patent No.: US 6,249,385 B1
(45) Date of Patent: *Jun. 19, 2001

(54) LASER IRRADIATION APPARATUS

(75) Inventors: Shunpei Yamazaki, Tokyo; Koichiro Tanaka; Naoto Kusumoto, both of Kanagawa, all of (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,185

(22) Filed: Jul. 22, 1999

Related U.S. Application Data

(63) Continuation of application No. 09/036,005, filed on Mar. 4, 1998, now Pat. No. 5,959,779.

(30) Foreign Application Priority Data

Mar. 4, 1997 (JP) .................................................. 9-065531

(51) Int. Cl.⁷ .................................................. G02B 27/10
(52) U.S. Cl. ............................................. 359/626; 438/487
(58) Field of Search ........................... 359/624, 623, 359/619, 621, 622, 620; 438/487

(56) References Cited

U.S. PATENT DOCUMENTS

| | | | |
|---|---|---|---|
| 3,667,832 | 6/1972 | Kitano et al. | 350/175 |
| 4,309,225 | 1/1982 | Fan et al. | 168/1.5 |
| 4,475,027 | 10/1984 | Pressley | 219/121 |
| 4,497,015 | 1/1985 | Konno et al. | 362/268 |
| 4,733,944 | 3/1988 | Fahlen et al. | 350/167 |
| 4,769,750 | 9/1988 | Matsumoto et al. | 362/268 |
| 5,097,291 | 3/1992 | Suzuki | 355/69 |
| 5,263,250 | 11/1993 | Nishiwaki et al. | 29/890.1 |
| 5,307,207 | 4/1994 | Ichihara | 359/622 |
| 5,414,559 | * 5/1995 | Burghardt et al. | 359/623 |
| 5,561,081 | 10/1996 | Takenouchi et al. | 437/174 |
| 5,721,416 | * 2/1998 | Burghardt et al. | 219/121.73 |
| 5,796,521 | * 8/1998 | Kahlert et al. | 359/621 |
| 5,800,625 | * 9/1998 | Engelsberg et al. | 134/1 |
| 6,038,075 | * 3/2000 | Yamazaki et al. | 359/626 |

OTHER PUBLICATIONS

Pennington, et al., "CCD Imaging Array Combining Fly's–Eye Lens with TDI for Increased Light–Gathering Ability"; IBM Technical Disclosure Bulletin, vol. 21(2); pp. 857–858, 1978.

Turner, et al. "Gas Immersion Laser Diffusion For Efficient Cell Fabricating And Grain Boudary Research"; 16th IEEE Photovoltaic Specialist Conference—1982; pp. 775–780, San Diego, CA, Sep. 27–30, 1982.

* cited by examiner

Primary Examiner—Scott J. Sugarman
(74) Attorney, Agent, or Firm—Fish & Richardson P.C.

(57) ABSTRACT

An apparatus for irradiating an irradiation surface with a laser light having a linear or rectangular shape. A homogenizer operates on the principle that variations in the light intensity profile of an original beam as emitted from a laser device are dispersed by passing the original beam through two multi-cylindrical lenses. The directions of the respective multi-cylindrical lenses are set so as not to be parallel with the beam movement direction. Thus, an uniformity of annealing by irradiating with a laser light is improved.

36 Claims, 10 Drawing Sheets

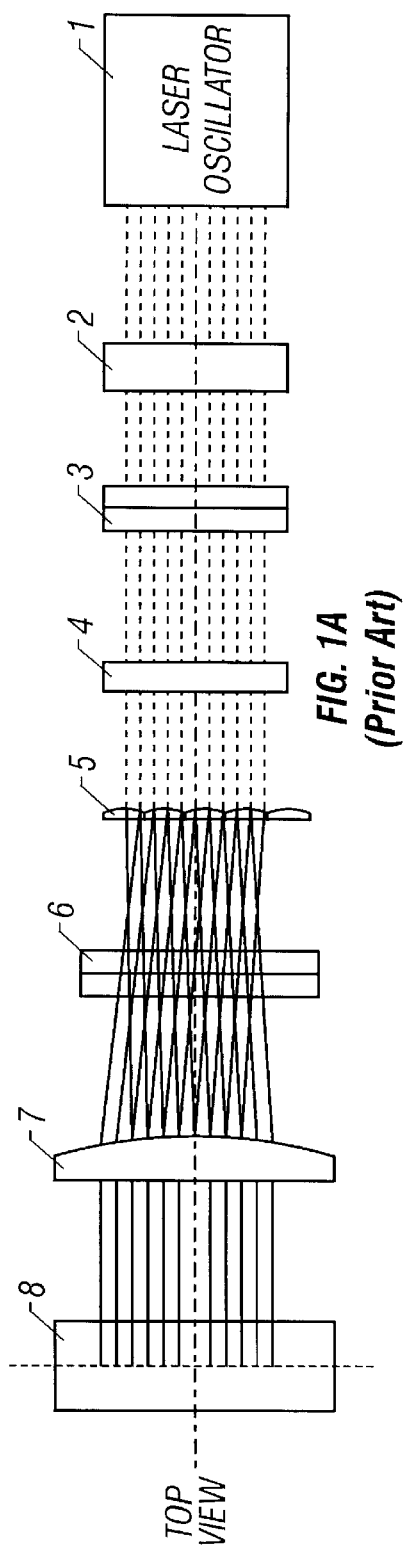
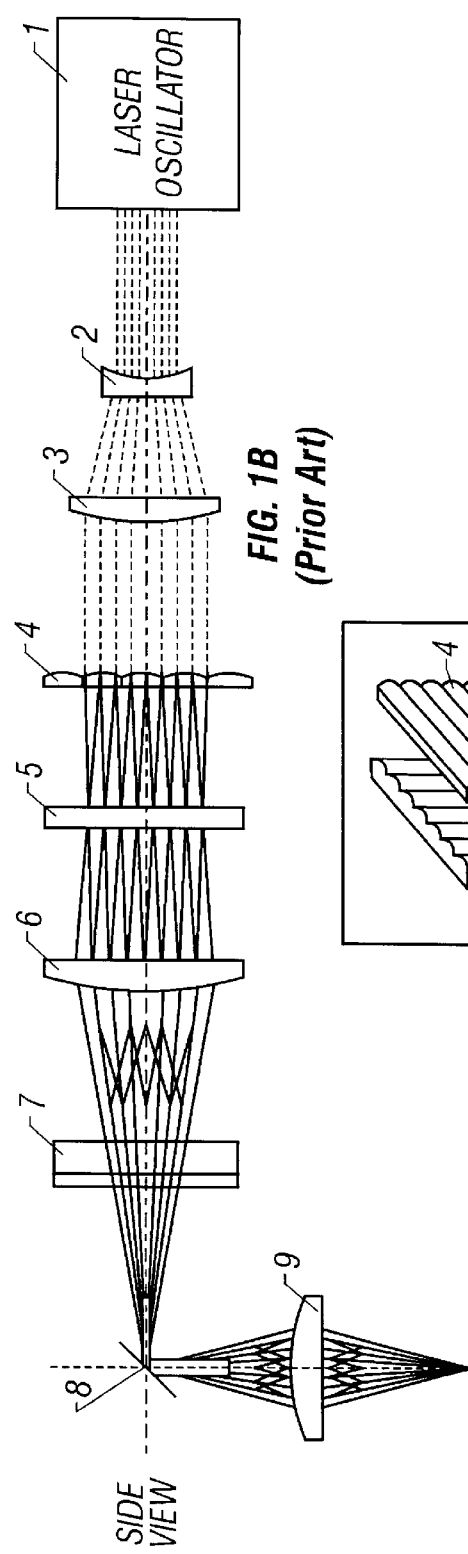
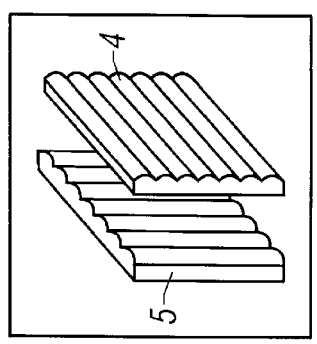
FIG. 1A *(Prior Art)*
FIG. 1B *(Prior Art)*
FIG. 1C *(Prior Art)*

LASER IRRADIATION APPARATUS

RELATED APPLICATION INFORMATION

This application is a continuation of U.S. application Ser. No. 09/036,005 filed Mar. 4, 1998, now U.S. Pat. No. 5,959,779.

BACKGROUND OF THE INVENTION

1. Field of the Invention

The present invention relates to an apparatus to be used for an annealing or exposure process including laser light irradiation. For example, the invention relates to an apparatus that provides a uniform irradiation effect in a laser annealing apparatus in which irradiation with a large-area beam is performed. This type of laser annealing apparatus is used for semiconductor manufacturing processes.

2. Description of the Related Art

The technique of crystallizing an amorphous silicon film by irradiation with laser light is known. Further, the technique of irradiating a silicon film that has been damaged by implantation of impurity ions to recover its crystallinity and to activate implanted impurity ions is also known. They are called laser annealing techniques.

A typical example of the latter technique is a technique for annealing the source and drain regions of a thin-film transistor. In this technique, the source and drain regions are annealed by laser light irradiation after implanting impurity ions such as phosphorus or boron ions into those regions.

Such a process with laser light irradiation has a feature that a substrate receives almost no thermal damage.

This feature decreases limitations on materials to be processed and provides an advantage in, for instance, forming a semiconductor device on a substrate such a glass substrate that is low in heat resistance. In particular, this feature is important in manufacturing an active matrix liquid crystal display device whose application range has expanded in recent years.

In the active matrix liquid crystal display device, it is desired to use a glass substrate due to requirements of cost reduction and increase in area.

The glass substrate cannot withstand a heat treatment at as high a temperature as more than 600° C. or even more than 700° C. The above-mentioned technique of crystallizing an amorphous silicon film or performing annealing after implantation of impurity ions by laser light irradiation is effective in avoiding this problem.

In the method of using laser light irradiation, even a glass substrate receives almost no thermal damage. As a result, a thin-film transistor using a crystalline silicon film can be formed even with the use of a glass substrate.

However, in general, laser light as generated from a lasing device (hereinafter referred to as "original beam") is small in beam area. Therefore, a common method of processing a large subject area is to scan it with laser light, which however has such problems as a long processing time and low uniformity in the effect of process in the subject area. In particular, because of a non-uniform light intensity profile, an ordinary original beam causes very poor uniformity in the effect of processing if it is used as it is.

In view of the above, various techniques have been proposed which modify an original beam so as to obtain a beam that is as uniform as possible and even a beam that is changed in size and shape so as to conform to the size, shape, etc. of a surface or region to be irradiated. The common shapes of a resulting beam are a rectangular shape and a linear shape. According to these techniques, uniform laser annealing can be performed over a large area.

FIG. 1 shows an example of a laser irradiation apparatus for modifying an original beam. In FIG. 1, a laser oscillator 1 is an excimer laser, for instance. The excimer laser 1 oscillates to emit laser light by establishing an excited state called an excimer state by decomposing a predetermined gas by high-frequency discharge.

For example, the KrF excimer laser produces excited states KrF* by high-voltage discharge by using material gases of Kr and F. Although this excited state has a life of several nanoseconds to several microseconds and hence is not stable, corresponding ground states KrF is even less stable. An inverted distribution is thereby produced in which the density of excited states is higher than that of ground states. This causes stimulated emission and laser light can be produced at relatively high efficiency.

It goes without saying that the laser oscillator 1 is not limited to an excimer laser and may be a pulsed laser or a CW laser. In general, the pulsed laser is suitable for the purpose of obtaining a high energy density.

An original beam emitted from the laser oscillator 1 is modified into a proper size by a concave lens 2 and a convex lens 3. FIG. 1 shows a case where the original beam is enlarged in the vertical direction. The beam at this stage is still called an original beam because its light intensity is equivalent to that of the state immediately after the emission from the laser oscillator 1.

The original beam then enters an optical device called a homogenizer, which includes at least two lens devices (each called a multi-cylindrical lens, a lenticular lens or a flyeye lens) 4 and 5 each having a large number of cylindrical lenses. In general, the multi-cylindrical lenses 4 and 5 are disposed orthogonally as shown in the insert view in FIG. 1.

The number of multi-cylindrical lenses may be one or three or more. Where only one multi-cylindrical lens is provided, the non-uniformity of the original beam in one direction is dispersed. Where two or more multi-cylindrical lenses are disposed so as to be orientated in the same direction, the same effect as would be obtained by increasing the number of constituent cylindrical lenses can be obtained.

By causing the original beam to pass through the homogenizer, a highly uniform beams with dispersed energy density can be obtained. The principle and the problems of the homogenizer will be described later. The beam is then modified into an intended shape by various kinds of lenses 6, 7, and 9, changed in direction by a mirror 8, and finally applied to a sample (see FIG. 1).

Next, the principle and the problems, which is to be solved by the invention, of the homogenizer will be described. To avoid complexity, in the following an optical discussion will be given to only one surface. Laser light that has passed through a multi-cylindrical lens is as shown in FIG. 2A.

In FIG. 2A, L is a multi-cylindrical lens including three constituent cylindrical lenses, and a laser light (an original beam) entering each cylindrical lens is refracted by it. The beams diffuse after being converged at focuses $F_1$–$F_3$. There occurs a mixing region where all of the light beams that have passed through the respective cylindrical lenses are mixed with each other.

Now assume that the original beam has a deviation in its light intensity profile and hence the beams entering the respective cylindrical lenses have different light intensities.

However, the deviation is dispersed in the mixing region because the beams that have passed through the respective cylindrical lenses are mixed with each other there. The light intensity is thus uniformized and a beam having a less varied light intensity profile can be obtained (see FIG. 2A).

Incidentally, if attention is paid to the optical paths after the passage through the multi-cylindrical lens, it is understood that the beams are regarded as being emitted from point light sources $F_1$–$F_3$ that are arranged at regular intervals. Further, since the original beam is coherent, the beams emitted from the respective point light sources also have equal phases and hence interfere with each other. That is, portions where the beams cancel out each other (nodes) and portions where the beams intensify each other (antinodes) occur depending on the distance x between the irradiation surface and the point light sources $F_1$–$F_3$ and the interval $2a$ between the point light sources $F_1$–$F_3$ (see FIG. 2B).

Contrary to the intended purpose, this means that the multi-cylindrical lens introduce a new version of non-uniformity to the light intensity profile. The positions of nodes and antinodes can be determined strictly in a case where the number of point light sources is as small as two or three. However, in an ordinary homogenizer the number of constituent cylindrical lenses is five or more (typically 10 to 30), in which case taking into account all interferences among many point light sources is no more than cumbersome and does not constitute an essential discussion. Therefore, a consideration will be given below to interference at a typical antinode position.

Where two point light sources exist, an antinode is formed at a position that is equally distant from the point light source irrespective of the distance x (see FIG. 3A). That is, where point light sources $F_1$ and $F_{-1}$ exist, a relationship $\overline{F_1 A} = \overline{F_{-1} A}$ holds at point A on an irradiation surface. Irrespective of the interval $2a$ between the point light sources $F_1$ and $F_{-1}$ and the distance x, beams coming from the point light sources $F_1$ and $F_{-1}$ have the same phase and hence intensify each other.

A consideration will now be given to a case where an additional point light source $F_{-2}$ exists (see FIG. 3B). In this case, a condition to be satisfied for beams coming from the point light source $F_{-2}$ and the other point light sources $F_1$ and $F_{-1}$ to have the same phase and intensify each other is such that an optical path difference $\overline{F_{-2}A} - \overline{F_{-1}A}$ be equal to an integral multiple $n\lambda$ of the wavelength, which condition depends on the parameters a and x. That is, $$\overline{F_{-1}A} - \overline{F_{-2}A} = n\lambda$$

should be satisfied.

Since a relationship a<<x usually holds, a simple calculation leads to $$\overline{F_{-1}A} - \overline{F_{-2}A} = 4a^2/x = n\lambda.$$

The same discussion applies to a point light source $F_2$ that is located at a position that is symmetrical to the position of the point light source $F_{-2}$ with respect to the broken line passing through point A.

Next, a consideration will be given to a case where additional point light sources $F_2$, $F_3$, $F_4$, $F_{-3}$, ... exist. In this case, as shown in FIG. 3C, optical path differences $\overline{F_3 A} - \overline{F_2 A}$ and $\overline{F_4 A} - \overline{F_3 A}$ satisfy $$\overline{F_3 A} - \overline{F_2 A} = 2(4a^2/x) = 2n\lambda$$

$$\overline{F_4 A} - \overline{F_3 A} = 3(4a^2/x) = 3n\lambda.$$

More generally, as shown in FIG. 7A, as for an m-th (as counted from point A) point light source $F_m$ and an (m+1)-th point light source $F_{m+1}$, an optical path difference $\overline{F_{m+1}A} - \overline{F_m A}$ satisfies $$\overline{F_{m+1}A} - \overline{F_m A} = 4ma^2/x.$$

Considering the relationship $$4a^2/x = n\lambda,$$

we obtain the following equation:

$$\overline{F_{m+1}A} - \overline{F_m A} = 4ma^2/x = mn\lambda.$$

That is, if a light beam coming from the point light source $F_2$ has the same phase as a light beam coming from the point light source $F_1$, beams coming from the other point light sources $F_3$, $F_4$, ..., $F_m$, $F_{m+1}$, ... also have the same phase and intensify each other (the beams coming from all the point light sources have the same phase and intensify each other).

The intensify of a light beam coming from a point light source is in inverse proportion to the distance from it. However, since the above discussion assumes the relationship a<<x which means that the distances between point A and the respective point light sources are approximately the same, a conclusion is obtained that the beams from all the point light sources intensify each other approximately equally. Light intensity I at point A is given by I=Ni, where i is the intensity of a light beam coming from each point light source and N is the number of point light sources.

A consideration will now be given to a condition to be satisfied for a light beam coming from the point light source $F_{-2}$ to cancel out, at point A, a light beam coming from the point light source $F_{-1}$. This occurs when those beams have an optical path difference that is equal to the half wavelength multiplied by an odd integer. That is, $$\overline{F_{-1}A} - \overline{F_{-2}A} = 4a^2/x = (n + \tfrac{1}{2})\lambda$$

should be satisfied (see FIG. 4A).

When this condition is satisfied, beams coming from the point light sources $F_1$ and $F_{-1}$ are canceled out by an opposite-phase light beam coming from the point light source $F_{-2}$ and light intensity I at point A is given by I=2i−i=i.

Where another point light source $F_2$ exists as shown in FIG. 4B, since a light beam coming from the point light source $F_2$ also has a phase opposite to that of a light beam coming from the point light source $F_1$, the light intensity at point A becomes 0.

Next, a consideration will be given to point light sources $F_3$ and $F_4$. As shown in FIG. 4C, optical path differences $\overline{F_3 A} - \overline{F_2 A}$ and $\overline{F_4 A} - \overline{F_3 A}$ satisfy $$\overline{F_3 A} - \overline{F_2 A} = 2(4a^2/x) = (2n+1)\lambda$$

$$\overline{F_4 A} - \overline{F_3 A} = 3(4a^2/x) = (3n+1+\tfrac{1}{2})\lambda.$$

That is, a light beam coming from the point light source $F_3$ has the same phase as a light beam coming from the point light source $F_2$ (i.e., it has a phase opposite to that of a light beam coming from the point light source $F_1$), and a light beam coming from the point light source $F_4$ has a phase opposite to that of a light beam coming from the point light source $F_3$ (i.e., it has the same phase as the light beam coming from the point light source $F_1$) (see FIG. 4C).

More generally, as for an m-th (as counted from point A) point light source $F_m$ and an (m+1)-th point light source $F_{m+1}$, an optical path difference $\overline{F_{m+1}A} - \overline{F_m A}$ satisfies $\overline{F_{m+1}A} - \overline{F_mA} = 4ma^2/x = m(n+\frac{1}{2})\lambda.$ Now, a consideration will be given to the phases of beams coming from point light sources $F_m$ with respect to the phase of the light beam coming from the point light source $F_1$.

$\overline{F_2A} - \overline{F_1A} = (n+\frac{1}{2})\lambda$ $\overline{F_3A} - \overline{F_2A} = (2n+1)\lambda$ $\overline{F_4A} - \overline{F_3A} = (3n+\frac{3}{2})\lambda$ $\overline{F_mA} - \overline{F_{m-1}A} = (m-1)(n+\frac{1}{2})\lambda$ Summing up the above equations, we obtain (left side)=$\overline{F_mA} - \overline{F_1A}$ (right side)=$\{m(m-1)\}(n+\frac{1}{2})\lambda \div 2$.

Where m=4, 5, 8, 9, ..., 4k, 4k+1, ..., the optical path difference $\overline{F_mA} - \overline{F_1A}$ is calculated as $\overline{F_mA} - \overline{F_1A} = k(4k-1)(2n+1)\lambda(m=4k)$ or $\overline{F_mA} - \overline{F_1A} = 4k^2(4n+2)\lambda(m=4k+1).$ Therefore, a light beam coming from the point light source $F_m$ has the same phase as that coming from the point light source $F_1$. In the other cases, the light beam coming from the point light source $F_m$ has a phase opposite to that of the light beam coming from the point light source $F_1$.

Although the phase relationship is complex as described above, the light intensity I at point A varies between 0 and 2i and is anyway sufficiently smaller than that in the case of FIGS. 3A–3C.

Discussions similar to the above can be made with respect to point B that is the foot of the perpendicular from each point light source to the irradiation surface. Point B is a point closest to a certain point light source $F_0$ in the irradiation surface. Consider a case where additional point light sources $F_1$ and $F_{-1}$ exist adjacent to the point light source $F_0$. In this case, a relationship $\overline{F_1B} = \overline{F_{-1}B}$ naturally holds, which means beams coming from the point light sources $F_1$ and $F_{-1}$ intensify each other irrespective of a, x, and $\lambda$.

If $\overline{F_1B} - \overline{F_0B} = n\lambda$, a light beam coming from the point light source $F_0$ also has the same phase as that coming from the point light source $F_1$ at point B and hence the light intensity I at point B is given by I=3i. In this case, a relationship $2a^2/x = n\lambda$ holds (see FIG. 5A).

On the other hand, if $\overline{F_1B} - \overline{F_0B} = (n+\frac{1}{2})\lambda$, the light beam coming from the point light source $F_0$ has a phase opposite to that of the light beam coming from the point light source $F_1$ at point B and hence the light beams offset each other so that the light intensity I at point B is given by I=i. In this case, a relationship $2a^2/x = (n+\frac{1}{2})\lambda$ holds (see FIG. 6A).

Next, a consideration will be given to a case where additional point light sources $F_2$, $F_{-2}$, $F_3$, $F_{-3}$, ... exist. Where the condition of FIG. 5A is satisfied, relationships $\overline{F_2B} - \overline{F_1B} = 3(2a^2/x) = 3n\lambda$ $\overline{F_3B} - \overline{F_2B} = 5(2a^2/x) = 5n\lambda$ hold (see FIG. 5B).

More generally, as shown in FIG. 7B, as for an m-th (as counted from point B) point light source $F_m$ and an (m+1)-th point light source $F_{m+1}$, an optical path difference $\overline{F_{m+1}B} - \overline{F_mB}$ satisfies $\overline{F_{m+1}B} - \overline{F_mB} = 2(2m+1)a^2/x = (2m+1)\lambda.$ That is, if the light beam coming from the point light source $F_1$ has the same phase as that coming from the point light source $F_0$, beams coming from the point light sources $F_2$, $F_3$, ..., $F_m$, $F_{m+1}$, ... also have the same phase and intensify each other (the beams coming from all the point light sources have the same phase and intensify each other). The light intensity I at point B is given by I=Ni where N is the number of point light sources.

On the other hand, where the condition of FIG. 6A is satisfied, relationships $\overline{F_2B} - \overline{F_1B} = (3n+1+\frac{1}{2})\lambda$ $\overline{F_3B} - \overline{F_2B} = (5n+2+\frac{1}{2})\lambda$ hold (see FIG. 6B). That is, a light beam coming from the point light source $F_2$ has a phase opposite to that of a light beam coming from the point light source $F_1$ (the former has the same phase as a light beam coming from the point light source $F_0$). A light beam coming from the point light source $F_3$ has a phase opposite to that of the light beam coming from the point light source $F_2$ (the former has the same phase as a light beam coming from the point light source $F_1$).

More generally, the following relationships hold:

$\overline{F_1B} - \overline{F_0B} = (n+\frac{1}{2})\lambda$ $\overline{F_2B} - \overline{F_1B} = 3(n+\frac{1}{2})\lambda$ $\overline{F_3B} - \overline{F_2B} = 5(n+1)\lambda$ $\overline{F_mB} - \overline{F_{m-1}B} = (2m+1)(n+\frac{1}{2})\lambda.$ Summing up the above equations, we obtain (left side)=$\overline{F_mB} - \overline{F_0B}$ (right side)=$\{m(m+2)\}(n+\frac{1}{2})\lambda.$ That is, where m is an odd number (2k), the optical path difference $\overline{F_mB} - \overline{F_0B}$ is calculated as $\overline{F_mB} - \overline{F_0B} = 2k(k+1)(2n+1)\lambda.$ Therefore, a light beam coming from the point light source $F_m$ has the same phase as that coming from the point light source $F_0$. In the other cases, the light beam coming from the point light source $F_m$ has a phase opposite to that of the light beam coming from the point light source $F_0$.

Although the phase relationship is complex as described above, the light intensity I at point B varies between 0 and 2i and is anyway sufficiently smaller than in the case of FIGS. 5A and 5B.

In the above examples, the interference conditions, at each of the peculiar points A and B, of beams coming from a plurality of point light sources were determined. The number of points equivalent to points A and B is approximately equal to the number of point light sources (i.e., the number of constituent cylindrical lenses). At points A and B, the light intensity is very high or close to 0 depending on the values of a, x, and $\lambda$.

For example, if a=1 mm, x=1 m=$10^3$ mm, and $\lambda$=0.25 $\mu$m=0.25×$10^{-3}$ mm, the light intensity at point A corresponds to the case of FIGS. 3A–3C (beams intensify each other) when x=970 mm, corresponds to the case of FIGS. 4A–4C (beams cancel out each other) when x=985 mm, again corresponds to the case of FIGS. 3A–3C when x=1, 000 mm, and so forth. The interference states drastically vary every time the distance x between the multi-cylindrical lens to the irradiation surface is changed by 15 mm.

At point B, the intensity varies at a cycle that is a half of the above cycle (7.5 mm).

Satisfying the condition of FIGS. 5A and 5B, i.e., $2a^2/x=n\lambda$, means that the condition of FIGS. 3A–3C is also satisfied; both of points A and B are antinodes. However, the condition of FIGS. 5A and 5B is not always satisfied even if the condition of FIGS. 3A–3C is satisfied.

Similarly, satisfying the condition of FIGS. 6A and 6B, i.e., $2a^2/x=(n+\frac{1}{2})\lambda$, is equivalent to satisfying the condition of FIGS. 4A–4C; points A and B become an antinode and a node, respectively. However, the condition of FIGS. 6A and 6B is not always satisfied even if the condition of FIGS. 4A–4C is satisfied.

In this manner, each of points A and B becomes a node in some case and an antinode in another case. Now assume a case where a certain condition is satisfied and antinodes appear on an irradiation surface. Where multi-cylindrical lenses are arranged orthogonally as in the case of FIG. 1, beams intensify each other at portions where antinodes intersect each other and dot-like antinodes (i.e., portions of high light intensity) thereby appear in a regular manner as shown in FIG. 8A.

Th expanse of each of the above dot-like antinodes varies depending on the condition satisfied, and in a certain situation part or all of the above dot-like antinodes may turn to nodes.

If beams are modified into linear shapes, that is, if they are compressed (reduced) in a beam movement direction (scanning direction) and expanded in the direction perpendicular to the beam movement direction, a light intensity profile as shown in FIG. 8B appears in which the light intensity is unduly high at the antinodes and close to 0 at the nodes. Defects are prone to occur at the portions of these two types when the irradiated sample is subjected to annealing. In particular, the problem is serious if variations in light intensity are steep.

Two problems arise when laser annealing is performed by using beams as described above. The first problem is non-uniformity caused by overlap of beam spots. This is because in applying laser light while moving it the next beam (beam spot-2 in FIG. 8C) is applied so as to overlap with a first beam (beam spot-1). Practically it is impossible to perform irradiation without causing overlap of beams. However, it is possible to sufficiently reduce the influences of the overlap by optimizing the energy density and the number of pulses applied.

On the other hand, the problem of non-uniformity of a beam that is caused through interference according to the above-described principle is more serious. As shown in FIG. 8D, defects that are caused by the non-uniformity of a beam through interference occur in dotted form in a single beam spot. Further, defects-1 caused by the beam spot-1 and defects-2 caused by the beam spot-2 are located on the same lines, which results from the fact that the beam movement direction is parallel with the direction of at least one of the multi-cylindrical lenses. In the case of a linear beam, this results from the fact that the longitudinal direction of the beam is perpendicular to the direction of at least one of the multi-cylindrical lenses.

The term "direction of a multi-cylindrical lens" as used above means the direction of straight lines that are formed at the focuses by light that is output from the multi-cylindrical lens. That is, in FIG. 2A, the direction of the multi-cylindrical lens is the direction perpendicular to the paper surface. Further, the term "beam movement direction" is a higher-rank concept and does not simply mean a spatial movement direction, because in ordinary laser annealing apparatuses the optical path is changed several times by mirrors in a path from a homogenizer to an irradiation surface.

Thus, when a substrate is processed by a conventional laser annealing apparatus, there occur defects arranged perpendicularly to the beam movement direction and defects arranged parallel with it as shown in FIG. 8D. The former is linear defects due to overlap of beams and the latter is defects due to non-uniformity in light intensity that is caused by interference.

In particular, defects arranged in the horizontal and vertical directions are fatal to matrix devices (for instance, active matrix circuits and memory circuits) because defects occur on a certain row or column and hence are easy to find. In a liquid crystal display device, these defects are particularly problematic when driver circuits are also formed on the substrate.

SUMMARY OF THE INVENTION

The present invention has been made in view of the above problems in the art, and an object of the invention is therefore to improve the uniformity of annealing that is performed by irradiation with laser light.

According to a first aspect of the invention, the beam movement direction is not set parallel with the direction of any of multi-cylindrical lenses. According to a second aspect of the invention, in the case of using a linear beam, the longitudinal direction of the beam is not set perpendicular to the direction of any of multi-cylindrical lenses.

The concept of the invention will be described below with reference to FIGS. 9A–9E. For example, consider a homogenizer having two multi-cylindrical lenses 4 and 5 as shown in FIG. 1. Conventionally, the direction of the multi-cylindrical lens 4 is perpendicular to the beam movement direction as shown in FIG. 9B. On the other hand, the direction of the multi-cylindrical lens 5 is parallel with the beam movement direction. (Double-headed arrows indicate the directions of the respective multi-cylindrical lenses 4 and 5.)

This type of configuration has the problems as described above. In contrast, the invention provides, for instance, a configuration in which although the multi-cylindrical lens 4 is disposed in the same direction as in the conventional case, the multi-cylindrical lens 5 is inclined so as not to be parallel with the beam movement direction (see FIG. 9A). This configuration satisfies the requirement of the invention that none of the directions of the multi-cylindrical lenses are parallel with the beam movement direction.

With the homogenizer having the above configuration, dot-like defects (defects-1 and defects-2) due to non-uniformity that is caused by interference appear obliquely with respect to the beam movement direction as shown in FIG. 9C. In general, there is no inevitability that defects-1 and defects-2 occur on the same lines. Therefore, no linear defects are formed.

However, attention should be paid to a special case in which defects-1 and defects-2 occur on the same lines. This corresponds to a case where the distance d between the top of a certain one of straight lines representing dot-like defects (see FIG. 9D) and the bottom of some other straight line is 0. In this case, dot-like defects are aligned obliquely.

This problem occurs not only between adjacent straight lines but also other apart lines: it is necessary to prevent the distance d from becoming 0 even in the case of FIG. 9E.

However, particularly in the case of matrices, since dot-like defects on oblique straight lines are not parallel with the rows and columns of a matrix, they seldom constitute apparent linear defects.

The above discussion also applies in completely the same manner even if the term "beam movement direction" is replaced by another term "direction perpendicular to the longitudinal direction, i.e., the shorter-axis direction (of a linear beam)." The direction of the multi-cylindrical lens 4 need not be perpendicular to the beam movement direction; it is sufficient that the direction of the multi-cylindrical lens 4 be not parallel with the beam movement direction. Therefore, a configuration according to the invention can be obtained simply by rotating, around the optical axis of laser light, a homogenizer that has two orthogonal multi-cylindrical lenses like the conventional homogenizer, and can provide the advantages of the invention.

BRIEF DESCRIPTION OF THE DRAWINGS

FIG. 1 schematically shows an optical system of a conventional laser irradiation apparatus;

DETAILED DESCRIPTION OF THE PREFERRED EMBODIMENTS

Embodiment 1

An optical system according to this embodiment will be described below. The basic configuration of a laser irradiation apparatus according to this embodiment is the same as that shown in FIG. 1 except an angle around the optical axis of the multi-cylindrical lenses of the homogenizer. An original beam before entering the homogenizer has a rectangular shape of 6 cm×5 cm. The following description will be concentrated on the homogenizer.

In the configuration of this embodiment, the multi-cylindrical lens 5 is composed of 12 cylindrical lenses each being 5 mm in width and divides incident laser light into about 10 parts.

Figure 2A:
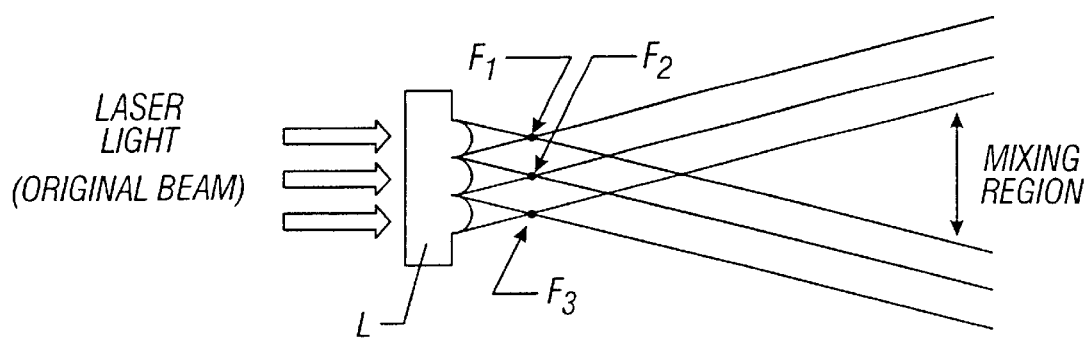
FIGS. 2A and 2B schematically show optical paths of a multi-cylindrical lens and a resulting interference of the prior art.
Figure 2B:
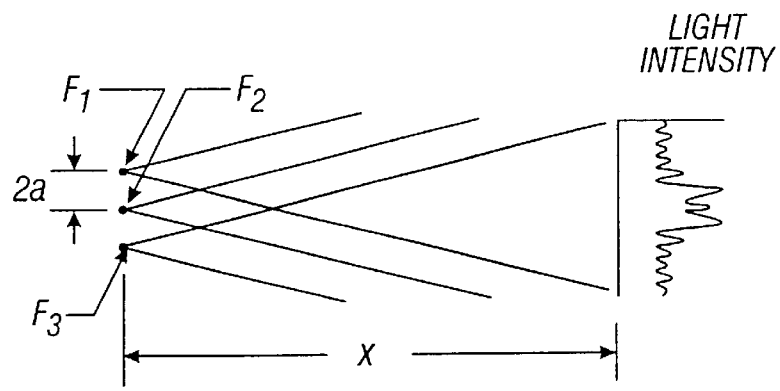
Figure 3A:
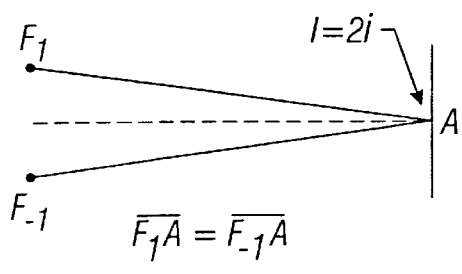
FIGS. 3A–3C to FIGS. 6A–6B illustrate interference conditions of coherent light beams coming from a plurality of point light sources of the prior art.
Figure 3B:
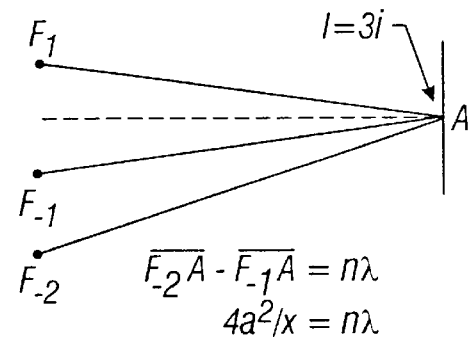
Figure 3C:
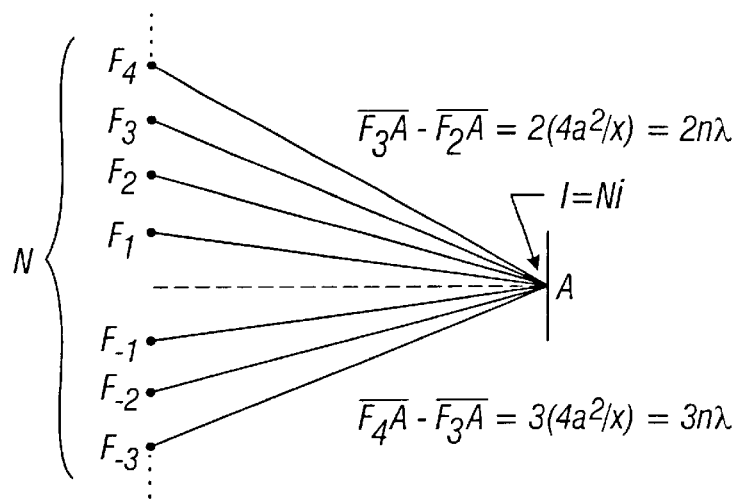
Figure 4A:
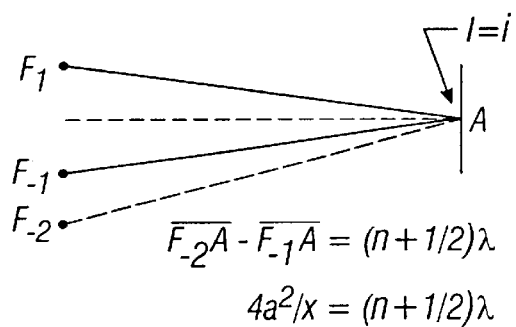
Figure 4B:
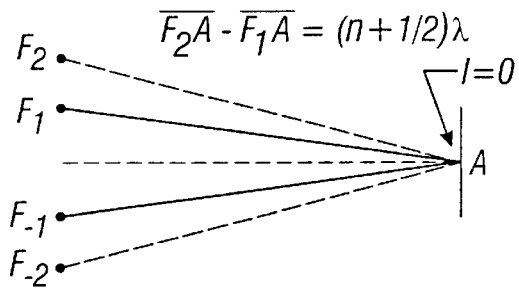
Figure 4C:
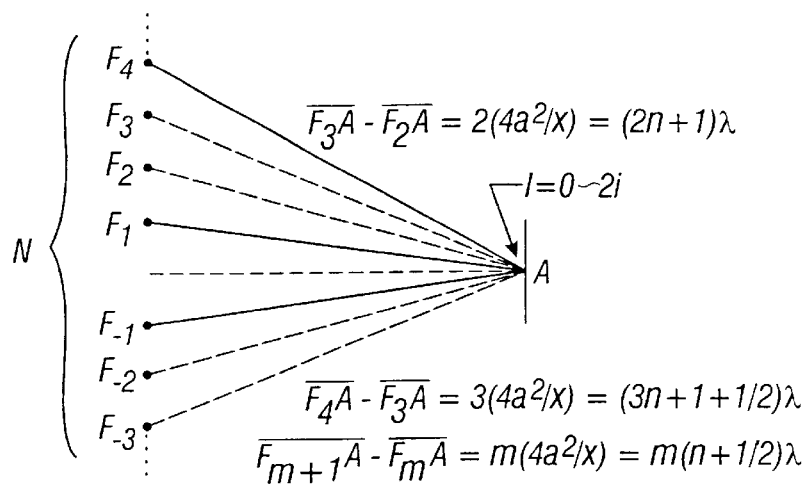
Figure 5A:
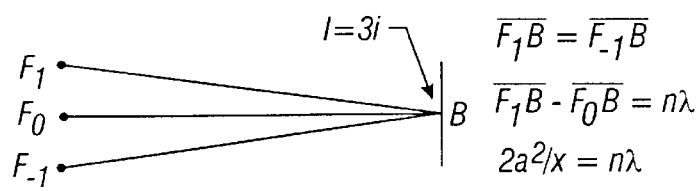
Figure 5B:
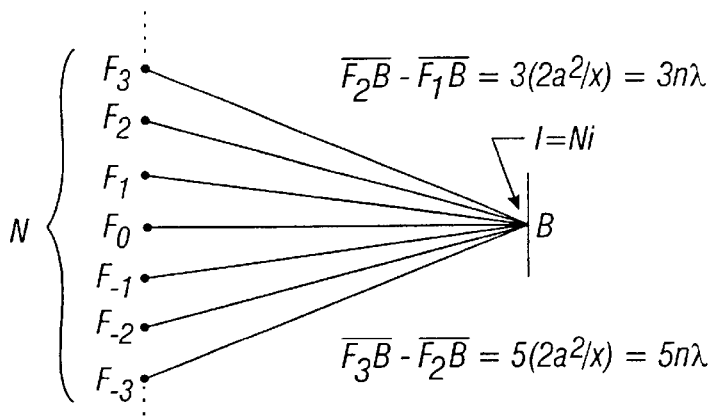
Figure 6A:
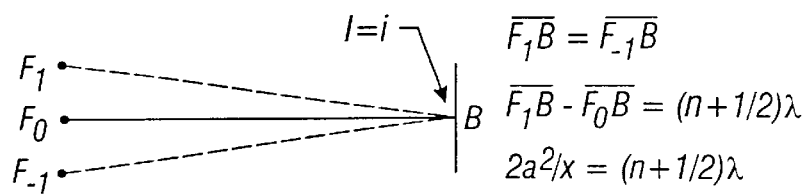
Figure 6B:
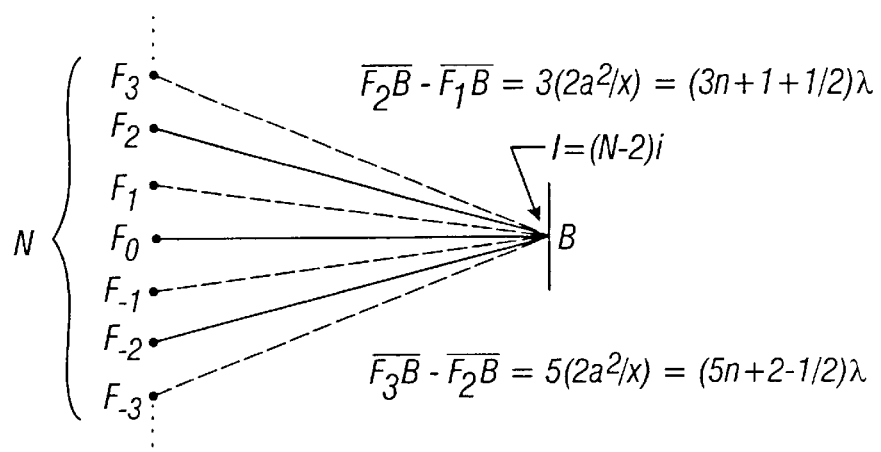
Figure 7A:
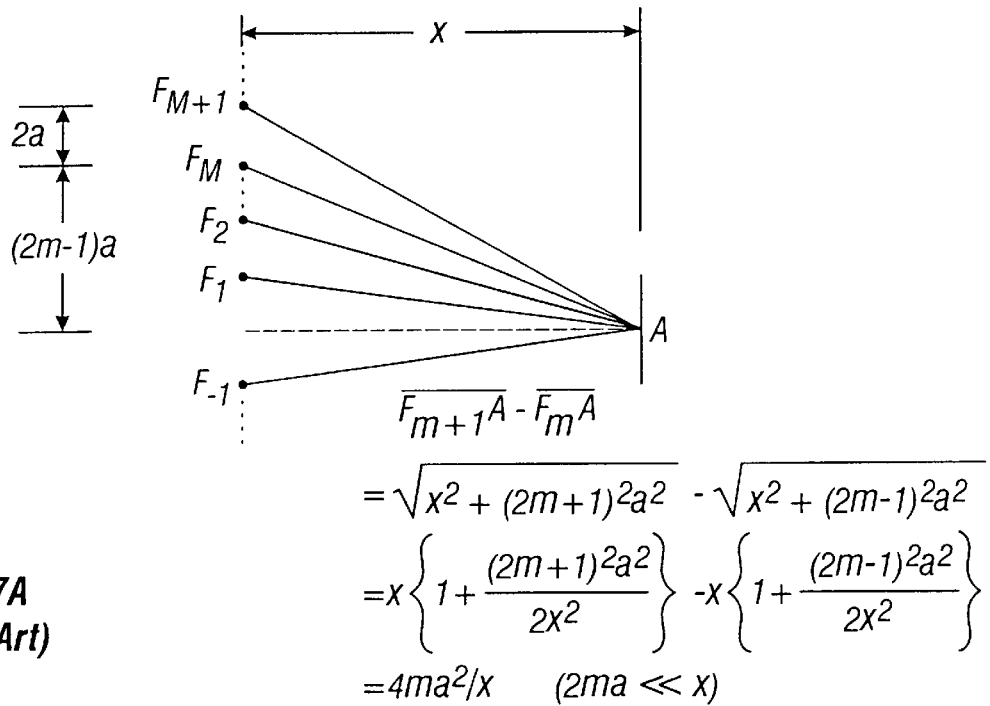
FIGS. 7A–7B show calculation formulae of optical path differences of light beams coming from a plurality of point light sources of the prior art.
Figure 7B:
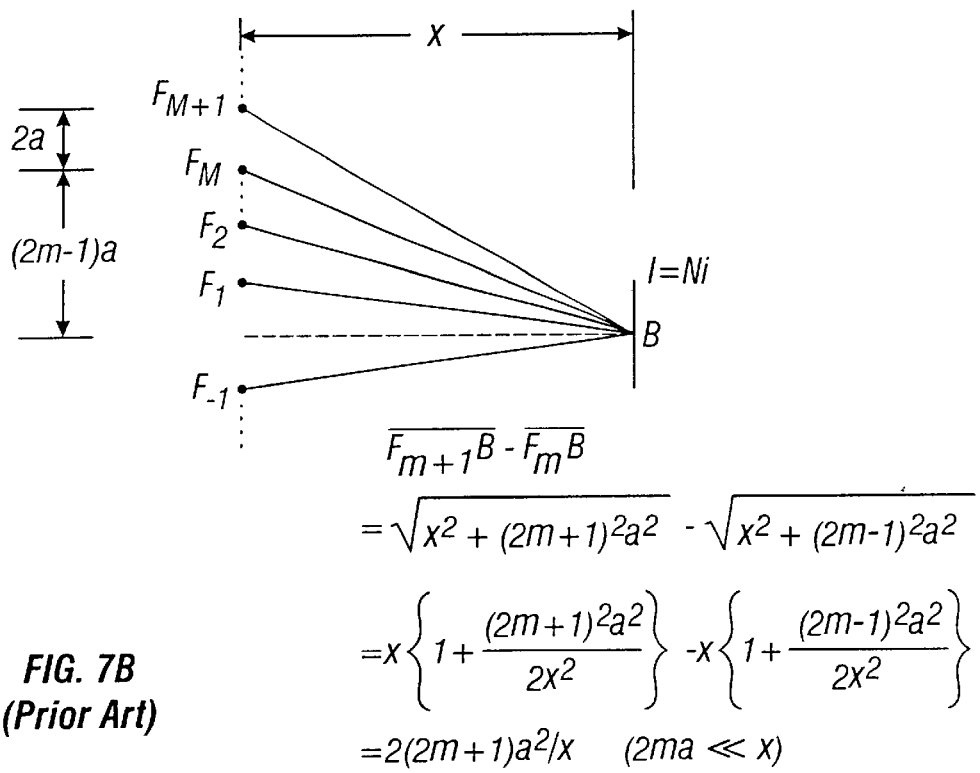
Figure 8A:
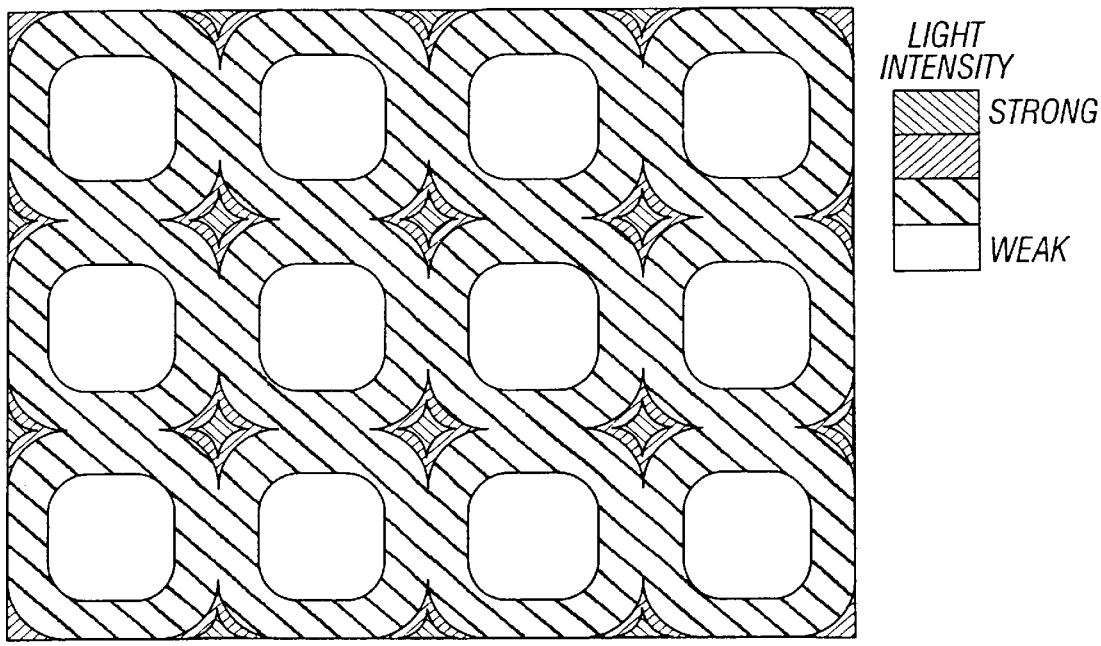
FIGS. 8A–8D illustrate how a conventional beam causes defects and how the defects are arranged, etc., of the prior art.
Figure 8B:
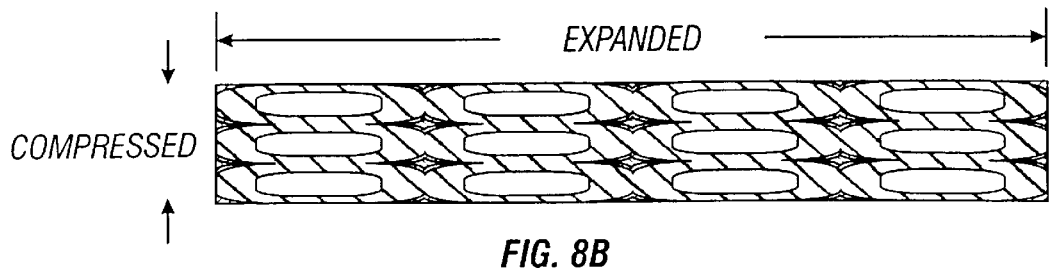
Figure 8C:
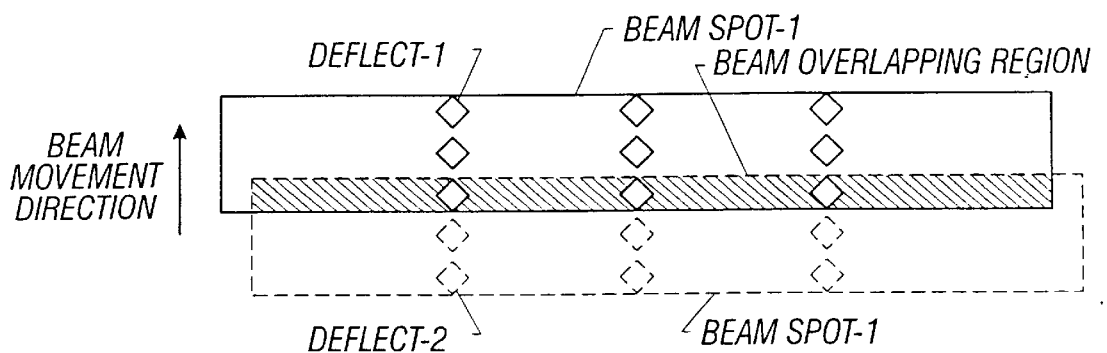
Figure 8D:
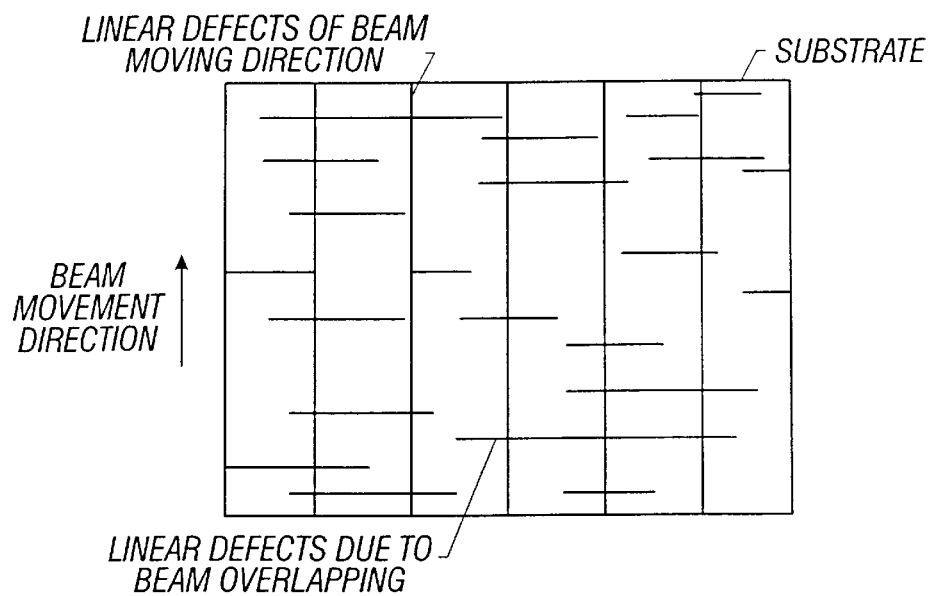
Figure 9A:
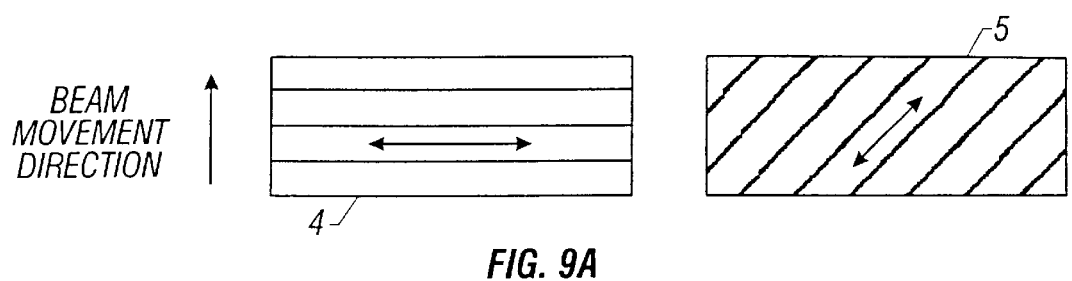
FIGS. 9A, 9C–9E illustrate configurations of multi-cylindrical lenses according to the invention, manners how defects occur, etc., and FIG. 9B illustrate a configuration of conventional multi-cylindrical lenses, manners how defects occur, etc.
Figure 9B:
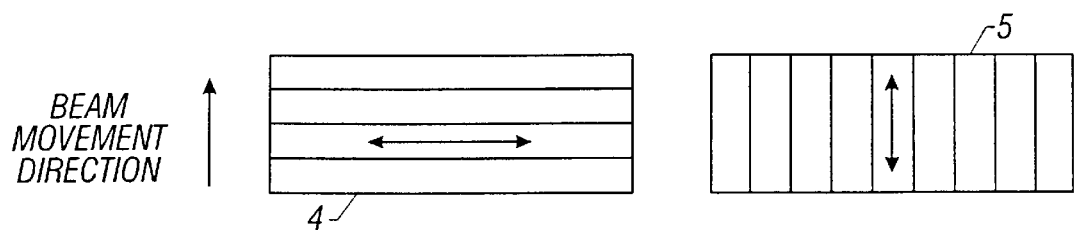
Figure 9C:
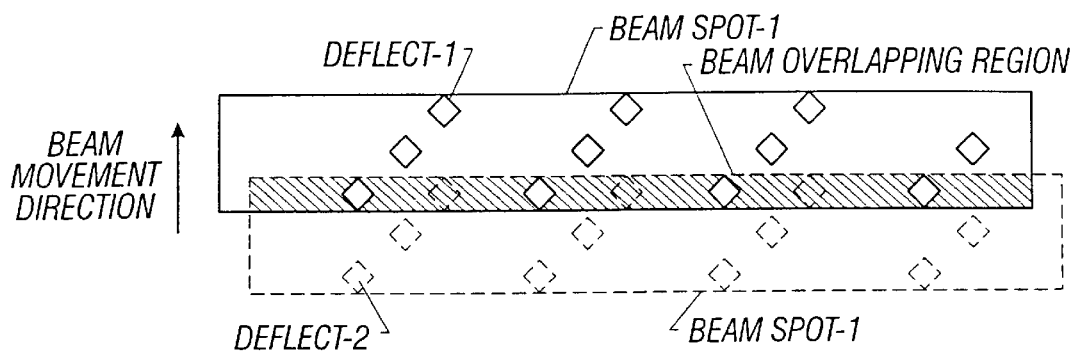
Figure 9D:
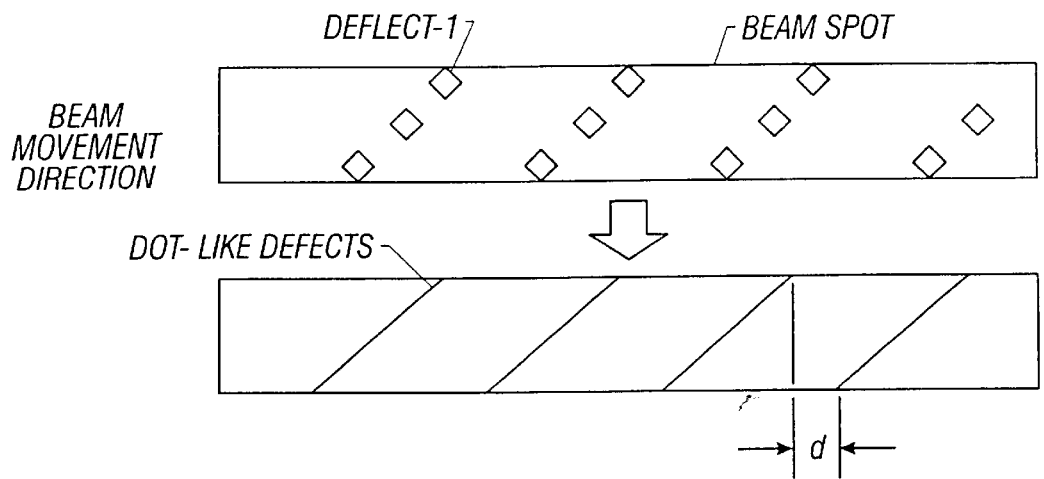
Figure 9E:
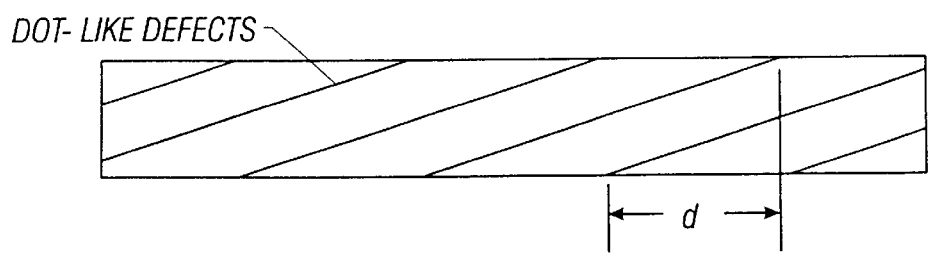

In this embodiment, a linear laser beam that is finally applied has a longitudinal length of 12 cm. The direction of the multi-cylindrical lens 5 is set so as to form 45° with the beam movement direction. On the other hand, the direction of the multi-cylindrical lens 4 is set perpendicular to the beam movement direction (see FIG. 9A).

The width of a beam that is output from the homogenizer is reduced, by the downstream optical system, by a factor of ⅟25 into 0.2 cm in the beam movement direction and enlarged by a factor of 2 into 12 cm in the direction perpendicular to the beam movement direction, whereby a linear beam is obtained.

Embodiment 2

Figure 10:
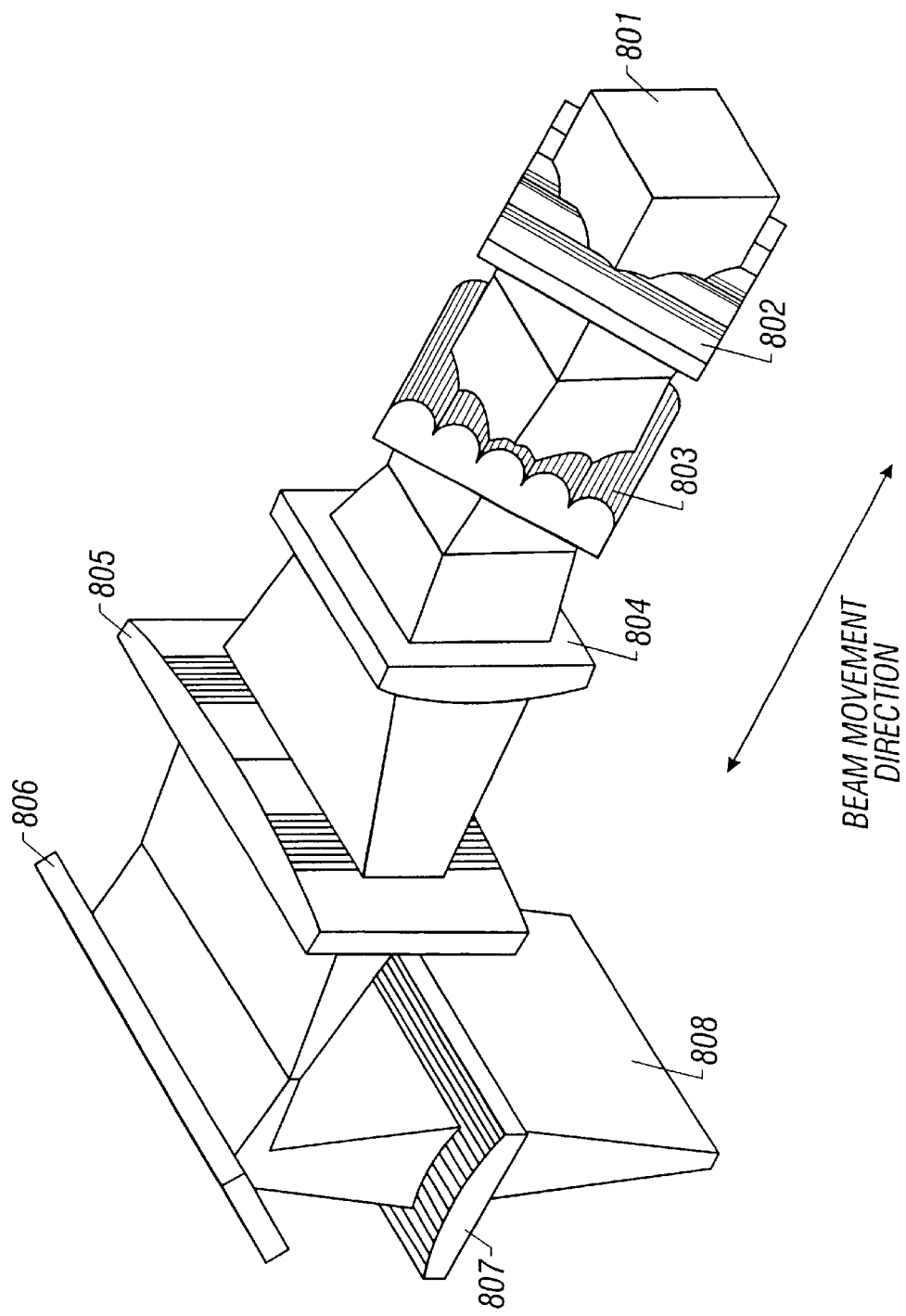
FIG. 10 schematically shows an optical system of a laser irradiation apparatus according to a second embodiment of the invention.

FIG. 10 schematically shows a configuration according to this embodiment.

In this embodiment, rectangular laser light 801 output from a laser oscillator (not shown) is passed through or reflected by multi-cylindrical lenses 802 and 803, cylindrical lenses 804 and 805, a mirror 806, and a cylindrical lens 807, whereby it is shaped into linear laser light, which is finally applied to an irradiation surface.

The configuration of FIG. 10 has a feature that the two multi-cylindrical lenses 802 and 803 are inclined by 45° from the beam movement direction and the longitudinal direction of the beam. (That is, the multi-cylindrical lenses 802 and 803 are located orthogonally each other.)

Although two multi-cylindrical lenses are used in this embodiment, three or more multi-cylindrical lenses may be used.

As described above, the invention provides a technique capable of performing uniform annealing over a large area in laser irradiation processes that are used for manufacture of semiconductor devices, for instance.

What is claimed is:

1. A method of irradiating with a laser light having a linear or rectangular shape,
   said method comprising the steps of:
   scanning with the laser light in a scanning direction,
   wherein the laser light is generated by a laser irradiation apparatus,
   wherein the laser irradiation apparatus comprising:
   a homogenizer including at least one multi-cylindrical lens;
   a plurality of cylindrical lenses in the multi-cylindrical lens,
   wherein a direction of the multi-cylindrical lens is not parallel with the scanning direction.

2. A method according to claim 1,
   wherein the homogenizer includes at least two multi-cylindrical lenses, and
   wherein the multi-cylindrical lenses are located perpendicular to each other.

3. A method according to claim 1,
   wherein the direction of the multi-cylindrical lens is defined as a direction of straight lines being formed at focuses by the laser light which outputs from the multi-cylindrical lens.

4. A method according to claim 1,
   wherein the homogenizer includes at least two multi-cylindrical lenses, and
   wherein one of the multi-cylindrical lenses makes an angle of 45° with respect the other of the multi-cylindrical lenses.

5. A method of irradiating with a laser light having a linear or rectangular shape,
   wherein the laser light is generated by a laser irradiation apparatus,
   wherein the laser irradiation apparatus comprising:
   a homogenizer including at least one multi-cylindrical lens;
   a plurality of cylindrical lenses in the multi-cylindrical lens, wherein a direction of the multi-cylindrical lens is not perpendicular to a longitudinal direction of the laser light.

6. A method according to claim 5,
wherein the homogenizer includes at least two multi-cylindrical lenses, and
wherein the multi-cylindrical lenses are located perpendicular to each other.

7. A method according to claim 5,
wherein the direction of the multi-cylindrical lens is defined as a direction of straight lines being formed at focuses by the laser light which outputs from the multi-cylindrical lens.

8. A method according to claim 5,
wherein the homogenizer includes at least two multi-cylindrical lenses, and
wherein one of the multi-cylindrical lenses makes an angle of 45° with respect the other of the multi-cylindrical lenses.

9. A method of fabricating a semiconductor device, said method comprising the steps of:
generating a laser light having a linear or rectangular shape by a laser irradiation apparatus,
wherein the laser irradiation apparatus comprising:
a homogenizer including at least one multi-cylindrical lens;
a plurality of cylindrical lenses in the multi-cylindrical lens,
scanning with the laser light in the scanning direction,
wherein a direction of the multi-cylindrical lens is not parallel with the scanning direction.

10. A method according to claim 9,
wherein the homogenizer includes at least two multi-cylindrical lenses, and
wherein the multi-cylindrical lenses are located perpendicular to each other.

11. A method according to claim 9,
wherein the direction of the multi-cylindrical lens is defined as a direction of straight lines being formed at focuses by the laser light which outputs from the multi-cylindrical lens.

12. A method according to claim 9,
wherein the homogenizer includes at least two multi-cylindrical lenses, and
wherein one of the multi-cylindrical lenses makes an angle of 45° with respect the other of the multi-cylindrical lenses.

13. A method according to claim 9,
wherein the semiconductor device is a thin film transistor.

14. A method according to claim 9,
wherein the semiconductor device is an active matrix display device.

15. A method according to claim 9,
wherein the semiconductor device is an active matrix type liquid crystal display device.

16. A method of fabricating a semiconductor device including a semiconductor film, said method comprising the steps of:
generating a laser light having a linear or rectangular shape by a laser irradiation apparatus,
wherein the laser irradiation apparatus comprising:
a homogenizer including at least one multi-cylindrical lens;
a plurality of cylindrical lenses in the multi-cylindrical lens,
crystallizing the semiconductor film by scanning with the laser light in a scanning direction,
wherein a direction of the multi-cylindrical lens is not parallel with the scanning direction.

17. A method according to claim 16,
wherein the homogenizer includes at least two multi-cylindrical lenses, and
wherein the multi-cylindrical lenses are located perpendicular to each other.

18. A method according to claim 16,
wherein the direction of the multi-cylindrical lens is defined as a direction of straight lines being formed at focuses by the laser light which outputs from the multi-cylindrical lens.

19. A method according to claim 16,
wherein the homogenizer includes at least two multi-cylindrical lenses, and
wherein one of the multi-cylindrical lenses makes an angle of 45° with respect the other of the multi-cylindrical lenses.

20. A method according to claim 16,
wherein the semiconductor device is a thin film transistor.

21. A method according to claim 16,
wherein the semiconductor device is an active matrix display device.

22. A method according to claim 16,
wherein the semiconductor device is an active matrix type liquid crystal display device.

23. A method of fabricating a semiconductor device, said method comprising the steps of:
generating a laser light having a linear or rectangular shape by a laser irradiation apparatus,
wherein the laser irradiation apparatus comprising:
a homogenizer including at least one multi-cylindrical lens;
a plurality of cylindrical lenses in the multi-cylindrical lens,
wherein a direction of the multi-cylindrical lens is not perpendicular to a longitudinal direction of the laser light,
annealing with the laser light.

24. A method according to claim 23,
wherein the homogenizer includes at least two multi-cylindrical lenses, and
wherein the multi-cylindrical lenses are located perpendicular to each other.

25. A method according to claim 23,
wherein the direction of the multi-cylindrical lens is defined as a direction of straight lines being formed at focuses by the laser light which outputs from the multi-cylindrical lens.

26. A method according to claim 23,
wherein the homogenizer includes at least two multi-cylindrical lenses, and
wherein one of the multi-cylindrical lenses makes an angle of 45° with respect the other of the multi-cylindrical lenses.

27. A method according to claim 23,
wherein the semiconductor device is a thin film transistor.

28. A method according to claim 23,
wherein the semiconductor device is an active matrix display device.

29. A method according to claim 23,
wherein the semiconductor device is an active matrix type liquid crystal display device.

30. A method of fabricating a semiconductor device including semiconductor film, said method comprising the steps of:

generating a laser light having a linear or rectangular shape by a laser irradiation apparatus, wherein the laser irradiation apparatus comprising:

a homogenizer including at least one multi-cylindrical lens;

a plurality of cylindrical lenses in the multi-cylindrical lens, wherein a direction of the multi-cylindrical lens is not perpendicular to a longitudinal direction of the laser light, crystallizing the semiconductor film by irradiating with the laser light.

31. A method according to claim 30, wherein the homogenizer includes at least two multi-cylindrical lenses, and wherein the multi-cylindrical lenses are located perpendicular to each other.

32. A method according to claim 30, wherein the direction of the multi-cylindrical lens is defined as a direction of straight lines being formed at focuses by the laser light which outputs from the multi-cylindrical lens.

33. A method according to claim 30, wherein the homogenizer includes at least two multi-cylindrical lenses, and wherein one of the multi-cylindrical lenses makes an angle of 45° with respect the other of the multi-cylindrical lenses.

34. A method according to claim 30, wherein the semiconductor device is a thin film transistor.

35. A method according to claim 30, wherein the semiconductor device is an active matrix display device.

36. A method according to claim 30, wherein the semiconductor device is an active matrix type liquid crystal display device.

* * * * *